United States Patent [19]

Carney, Jr. et al.

[11] 4,248,160
[45] Feb. 3, 1981

[54] RAILWAY HATCH COVER AND STRAP LATCHING ASSEMBLY

[75] Inventors: John L. Carney, Jr.; John A. K. Krug, Jr., both of St. Charles, Mo.

[73] Assignee: ACF Industries, Incorporated, New York, N.Y.

[21] Appl. No.: 19,819

[22] Filed: Mar. 12, 1979

[51] Int. Cl.³ .................. B61D 17/12; B61D 39/00; B65D 45/08
[52] U.S. Cl. ................................. 105/377; 220/314
[58] Field of Search ....................... 105/377; 220/314

[56] References Cited

U.S. PATENT DOCUMENTS

| 1,127,668 | 2/1915 | Nielsen et al. | 220/314 X |
| 1,739,911 | 12/1929 | McMurray | 220/314 |
| 2,324,356 | 7/1943 | Brown | 105/377 X |
| 2,745,362 | 5/1956 | Lunde | 105/377 |
| 2,816,683 | 12/1957 | Miers et al. | 105/377 X |
| 3,228,353 | 1/1966 | Carney, Jr. | 105/377 |
| 3,307,498 | 3/1967 | Stevens | 105/377 |
| 3,760,743 | 9/1973 | Walk | 220/314 X |

*Primary Examiner*—Howard Beltran
*Attorney, Agent, or Firm*—Henry W. Cummings

[57] ABSTRACT

A small hatch cover is provided which is pivotably mounted upon a hatch cover mounting bracket attached to a car roof. A hatch cover strap is also pivotably mounted upon the hatch cover mounting bracket. The hatch cover strap engages the cover at the center of the cover and at the distal end of the strap, only. At the distal end the strap extends around the cover and engages the lower surface of the cover. A sealing gasket is attached to the lower surface of the periphery of the cover. The sealing gasket engages a conventional hatch coaming extending vertically up from the car roof. Slots are preferably provided at the distal end of the cover and the strap. An over-center locking assembly is pivotably mounted upon the car roof which is movable between an open position which allows the operator to pivot the cover and strap to open position, and an engaged position in which the locking assembly engages the strap in an over-center locked position which applies sealing pressure to the cover at the center of the cover only. This sealing pressure is then transmitted through the cover to the periphery of the cover and to the coaming to urge the seal into firm engagement with the coaming.

18 Claims, 5 Drawing Figures

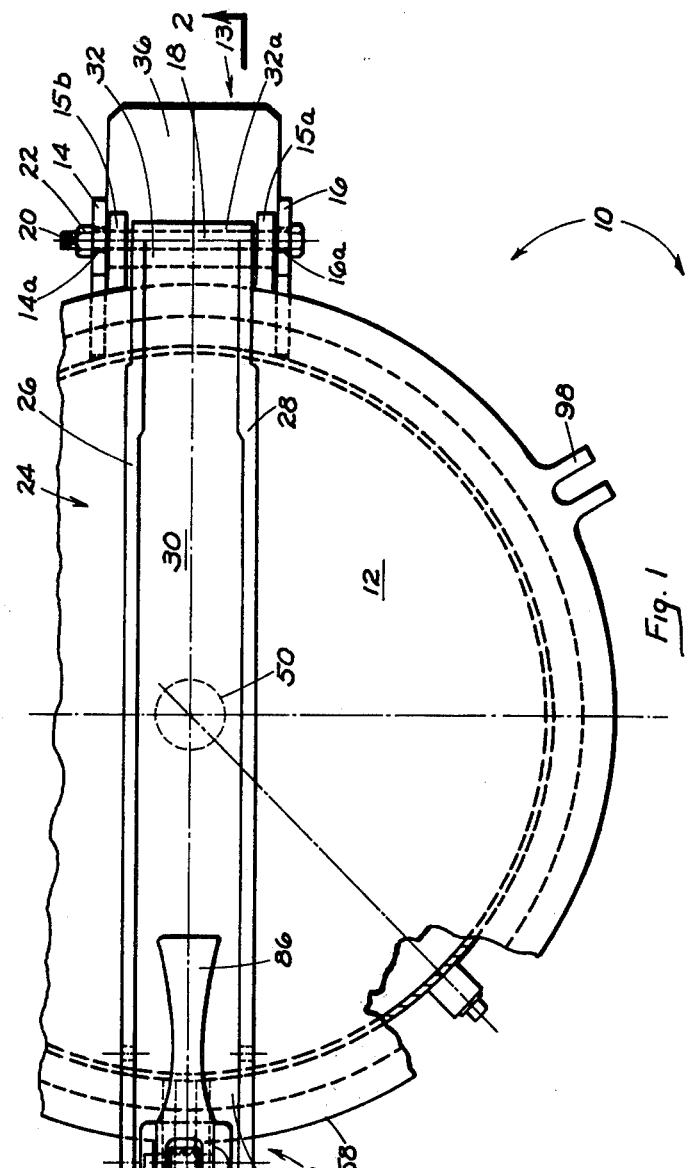

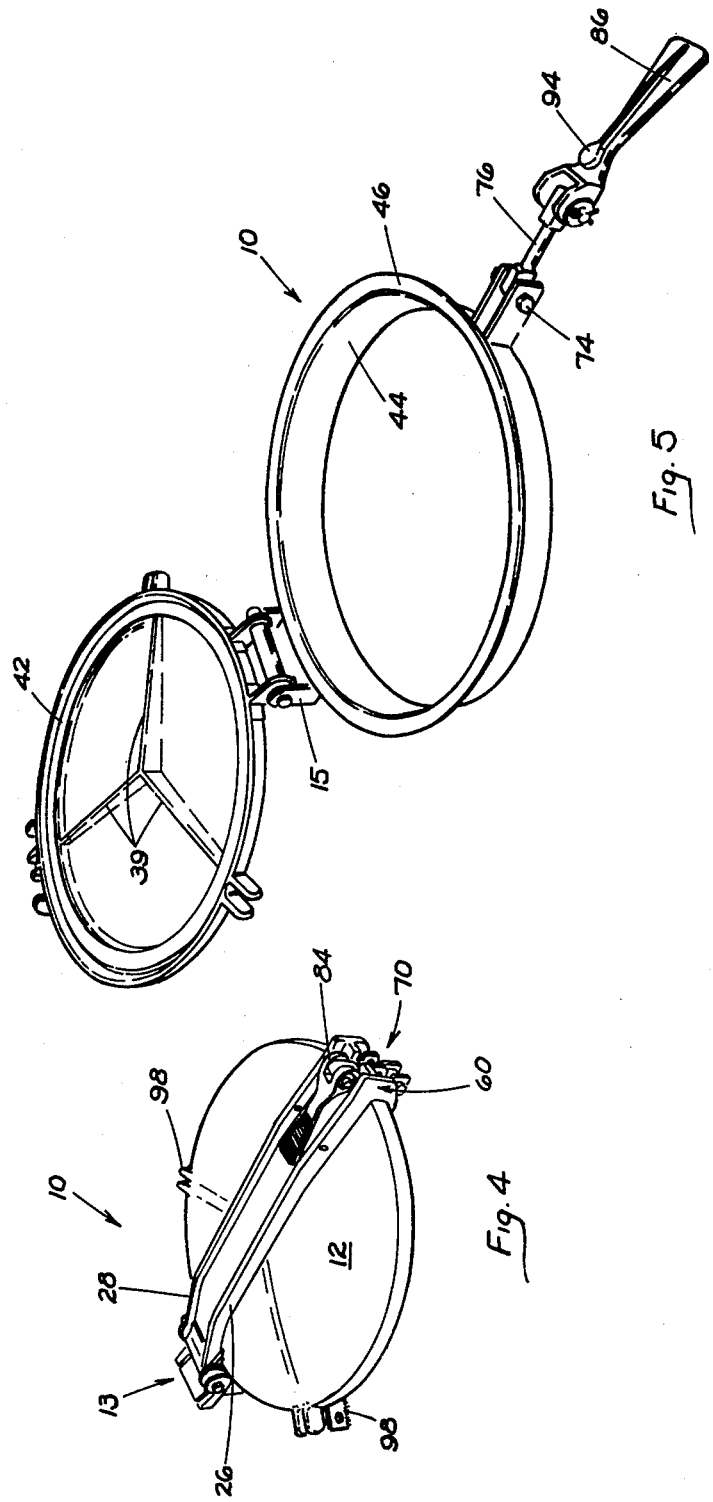

RAILWAY HATCH COVER AND STRAP LATCHING ASSEMBLY

BACKGROUND OF THE INVENTION

This invention relates to hatch covers of railway cars.

In U.S. Pat. No. 3,228,353, a hatch cover strap is pivotably mounted on a rail car roof and supports a round hatch cover for pivotal movement between open and closed positions. A stud is attached to the center portion of the cover which passes through an opening in the strap. A nut holds the cover in engagement with the strap. This patent also discloses (FIG. 4) hatch cover pivotably mounted upon the car roof and having three hand operated screw-down latches located 120° apart on the cover. In recent arrangements step-down, over-center latches have been substituted for these hand operated latches. See, for example, ACF Shippers Car Line Brochure No. SHPX-CF-9 7/66 (copy in application file) which discloses a round hatch with a similar strap and an over-center latch arrangement.

In U.S. Pat. No. 3,307,498, straps are attached to an elongated cover with fastening studs, and an over-center locking lever is used to hold the strap in closed position.

U.S. Pat. Nos. 2,816,683 and 3,760,743 also disclose hatch cover straps in which step-on, over-center latches hold the covers in closed position in transit.

All of the above references are hereby incorporated into the present application by this reference.

SUMMARY OF THE INVENTION

A small hatch cover is provided which is pivotably mounted upon a hatch cover mounting bracket attached to a car roof. A hatch cover strap is also pivotably mounted upon the hatch cover mounting bracket. The hatch cover strap engages the cover at the center of the cover and at the distal end of the strap only. At the distal end the strap extends around the cover and engages the lower surface of the cover. A sealing gasket is attached to the lower surface of the cover. The sealing gasket engages a conventional hatch coaming extending vertically up from the car roof. Slots are preferably provided at the distal end of the cover and the strap. An over-center locking assembly is pivotably mounted upon the car roof which is movable between an open position which allows the operator to pivot the cover and strap to open position, and an engaged position in which the locking assembly engages the strap in an over-center locked position which applies sealing pressure to the cover at the center of the cover only. This sealing pressure is transmitted through the cover to the periphery of the cover and to the coaming to urge the seal into firm engagement with the coaming.

The strap is adapted to be retrofitted to existing covers including those having three latches, since the strap mounting lug fits within laterally spaced cover mounting lugs through which a horizontal fastening bolt passes which pivotably mounts both the cover and the strap. The single over-center latch is more convenient for the operator since he need only open the latch to open the cover, rather than three in many existing hatch covers. The single strap cover engagement area in the center of the cover makes this strap-cover arrangement adaptable to the use of plastic or metal covers. The single strap cover engagement area enables a relatively thin plastic cover to transmit the sealing load to the periphery, making the use of plastic covers economically attractive.

THE DRAWINGS

FIG. 1 is a plan view of the hatch cover and strap assembly of the present invention;

FIG. 2 is a sectional view looking in the direction of the arrows along the line 2—2 in FIG. 1;

FIG. 3 is an end elevation view looking in the direction of the arrows along the line 3—3 in FIG. 1;

FIG. 4 is a perspective view of the cover and strap assembly in closed position;

FIG. 5 is a perspective view of the cover and strap assembly in open position.

DESCRIPTION OF PREFERRED EMBODIMENTS

In the drawings the hatch cover arrangement of the present invention is indicated generally at 10. The hatch cover arrangement includes a round hatch cover 12 and a hinge assembly 13.-Cover 12 includes laterally spaced mounting lugs 14 and 16 having openings therein 14a and 16a which receive a fastener 18 passing through a mounting bracket 15 having bracket lugs 15a and 15b welded to roof 17. Fastener 18 includes a threaded end 20 to which is attached a nut 22.

A hatch cover strap 24 includes a pair of laterally spaced vertical webs 26 and 28 and a body portion 30. The strap 24 also includes a mounting lug 32 having an opening therein 32a through which the pin 18 passes to pivotally mount the strap upon the mounting bracket 15. An open position stop 36 is rigidly attached to the car roof, preferably by welding.

The cover includes an inclined body portion 38 which increases upwardly toward the center of the cover. Optional stiffening ribs 39 may also be provided (FIG. 5). Around the periphery of the cover, on the lower surface thereof, a slot 40 is provided into which is inserted a gasekt seal 42 (FIG. 2). Gasket seal 42 engages a coaming 44 extending upwardly from the car roof 17 and having a seal engagement flange 46. The cover includes a generally horizontal center portion 48 which is engaged by a depending portion 50 of the strap 24.

The strap further includes an upwardly inclined portion 52 adjacent the pivot pin 18 and a downwardly inclined portion 54 extending towards a distal end 56 of the strap. The cover also includes a distal end 58.

The strap includes a wrap-around portion 60 which extends around the cover and engages the lower surface of the cover as indicated at 62. Both the cover and the strap are provided with respective slots 64 and 66.

An over-center locking arrangement is indicated in the drawings generally at 70. This over-center locking arrangement includes a "U"-shaped bracket 72 welded to the car roof. A pin 74 mounts a locking shaft 76 having a distal end portion 78 threadably attached to the shaft. Distal end portion includes an opening 78a to receive a pin 80. Pin 80 mounts an over-center locking member 82 having a bifurcated end portion 84 and a handle 86.

The wrap-around portion of the strap 60 includes a pair of inwardly directed spacers 87 and 88 upon which is mounted a wear plate 90 with a pair of fasteners 92. Spacers 87 and 88 guide vertical movement of locking shaft 76 and distal end 78. Bifurcated end portion 84 includes over-center portions 86 which engage the wear plate 90 in an over-center position when the cover and the strap are in closed position. A stop 92 is provided on the cover which engages a stop 94 on the locking handle in the closed position. It will be apparent that the handle 86 is of the step-on type whereby the operator may step on handle 86 to move it into the over-center locked position with the handle stop 94 engaging strap stop 92.

In the closed position, the pressure of the over-center locking member 82 applied to the strap 24 is transmitted to the strap center depending portion 50 and then into the cover horizontal portion 48. From here the force is transmitted through the inclined body portion 38 of the cover to the periphery to urge the seal 42 into tight engagement with the coaming flange 46. The inclined portions of the cover 38 readily transmit this load to the cover periphery. A metallic cover made of aluminum or steel may be used, or a plastic cover may be used. This arrangement allows the use of a relatively thin plastic cover, for instance, 3/16" inches thick, because the inclined portions 38 function as beams and can readily transmit this load.

Many previous hatch covers include latch lugs 98 mounted generally 120 degrees apart on the cover adapted to receive three locking latches. However, with the latch and strap assembly of the present invention, two latches may be eliminated and the single latch illustrated in the drawings utilized. Thus, to open or close the hatch, it is only necessary for the operator to open a single latch. Thus the number of latches that an operator must operate to open or close all the hatch covers on a car can be reduced by one-third from twenty-four (24) to eight (8). In inclement weather, this can make a considerable difference to the convenience of the operator.

To retrofit an existing cover with the strap arrangement of the present invention, the operator first inserts the portion 60 of the strap which extends around the distal end of the cover to ensure that the cover is integrally attached to the strap. Then the nut 22 and bolt 18 are removed and the strap mounting lug 32 is placed between the lugs 14 and 16. Then the nut 22 and bolt 18 are reinserted through the respective openings 16a, 32a and 14a and the nut 22 is threaded into place.

The latch assembly 70 is then pivoted into the upright position and the operator steps on the handle 86 to move the over-center portion 86 into engagement with the wear plate 90, and the stop 94 into engagement with the stop 92. If there exist on the car latches located 120 degrees apart, it is preferred to remove these latches when the cover and strap assembly of the present invention are installed.

To open the cover, the operator manually lifts the handle 86 and in so doing pivots the over-center portion 86 counter-clockwise about the pin 78. When the over-center pressure is released, the latch assembly can be pivoted counterclockwise about the pin 74 to a position no longer obstructing the strap or the cover. The strap and the cover can then be pivoted approximately 180° to the open position with the strap engaging the stop 36.

It therefore is apparent that the strap and hatch cover assembly of the present invention has the following advantages. Since the pressure of the latch assembly is applied to the cover in the center portion, the sealing pressure is distributed generally evenly by the inclined portion of the cover which functions as a beam to the periphery of the cover and to the seal, resulting in firm engagement to the seal with the hatch coaming. Applying the sealing load in this manner also enables the use of thinner metal sections, or plastic, for the cover. Existing hatch covers having three latches per cover can be reduced to a single latch, making opening and closing of the covers much easier for the operator.

What is claimed is

1. A hatch cover assembly comprising: a hatch cover pivotably mounted upon a hatch cover mounting bracket attached to a car roof; a hatch cover strap also pivotably mounted upon said hatch cover mounting bracket; and said hatch cover strap engaging the cover only at the center of the cover and at the distal end of the cover; said strap having a distal end portion which extends around the cover and engages the lower surface of the cover in closed position; a sealing gasket attached to one of the lower surface of said cover and a hatch coaming extending vertically up from the car roof; an over-center locking assembly pivotably mounted upon the car roof adjacent the distal end of said cover and said strap; said locking assembly being movable between an open position which allows the operator to pivot the cover and strap to open position, and an engaged position in which the locking assembly engages the strap in an over-center locked position; whereby in said locked position said locking assembly applies sealing pressure to the cover at the center of the cover only, and whereby said sealing pressure is transmitted through the cover to the periphery of the cover and to the seal to urge the seal into firm engagement with the cover and the coaming.

2. A hatch cover assembly according to claim 1 wherein a strap mounting lug having a fastener opening fits between laterally spaced mounting lugs through which a fastener passes which pivotably mounts both said cover and said strap.

3. A hatch cover assembly according to claim 2 wherein said fastener is removable.

4. A hatch cover assembly according to claim 1 wherein slots are preferably provided on the cover at the distal end of said strap to receive an over-center locking assembly.

5. A hatch cover assembly according to claim 1 wherein said strap is provided with a depending center portion which engages a generally horizontal strap engagement portion of said cover.

6. A hatch cover assembly according to claim 5 wherein said cover is inclined upwardly from the periphery toward said strap engagement portion.

7. A hatch cover assembly according to claim 6 wherein said strap includes strap inclined portions on either side of said center depending portion, which are located above the inclined portions of said cover.

8. A hatch cover assembly according to claim 1 wherein said strap is provided with a pair of laterally spaced web portions extending across said cover.

9. A hatch cover assembly according to claim 1 wherein said strap distal end includes a pair of transversely spaced portions which engage the lower surface of said cover.

10. A hatch cover assembly according to claim 9 wherein said strap distal end includes transversely extending spacers to guide vertical movement of said over-center locking assembly into engaged position.

11. A hatch cover assembly according to claim 10 wherein a wear plate is mounted upon said transversely extending spacers.

12. A hatch cover assembly according to claim 1 wherein said locking assembly includes a shaft pivotably mounted on the car roof having an over-center locking handle attached to the distal end of said shaft.

13. A hatch cover assembly according to claim 12 wherein said over-center locking handle is pivotably mounted upon said shaft and includes an over-center lug portion which engages said strap distal end to apply sealing pressure to said strap and to said cover.

14. A hatch cover assembly according to claim 13 wherein said handle includes a stop which engages a stop on said strap when said handle is in the over-center position.

15. A hatch cover assembly according to claim 1 wherein a groove is provided in the lower surface of the periphery of said cover and said seal fits within said groove.

16. A hatch cover assembly according to claim 1 wherein said cover is made of aluminum.

17. A hatch cover assembly according to claim 1 wherein said cover is made of plastic.

18. A hatch cover assembly according to claim 1 wherein said strap is made of stainless steel.

* * * * *

UNITED STATES PATENT AND TRADEMARK OFFICE
CERTIFICATE OF CORRECTION

PATENT NO. : 4,248,160
DATED : February 3, 1981
INVENTOR(S) : John L. Carney, Jr.; John A.K. Krug, Jr.

It is certified that error appears in the above-identified patent and that said Letters Patent are hereby corrected as shown below:

In Column 1, line 6, "of" should read ---for---.
In Column 2, line 39, "gasekt" should read --gasket---.
In Column 3, line 67, "to" should read ---of--.

Signed and Sealed this

Twenty-second Day of September 1981

[SEAL]

Attest:

GERALD J. MOSSINGHOFF

Attesting Officer     Commissioner of Patents and Trademarks